(12) United States Patent
Qutub et al.

(10) Patent No.: US 7,770,061 B2
(45) Date of Patent: Aug. 3, 2010

(54) FAULT RECOVERY IN CONCURRENT QUEUE MANAGEMENT SYSTEMS

(75) Inventors: Sami Qutub, Freehold, NJ (US); Rafal Sitkowski, Old Bridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1462 days.

(21) Appl. No.: 11/143,809

(22) Filed: Jun. 2, 2005

(65) Prior Publication Data

US 2006/0274372 A1 Dec. 7, 2006

(51) Int. Cl.
*G06F 11/00* (2006.01)
*G06F 11/34* (2006.01)

(52) U.S. Cl. ................ 714/9; 370/229; 370/235; 370/412

(58) Field of Classification Search ............... 714/9, 714/43; 370/229, 235, 412
See application file for complete search history.

(56) References Cited

U.S. PATENT DOCUMENTS

| | | | | |
|---|---|---|---|---|
| 5,050,161 | A * | 9/1991 | Golestani | 370/230 |
| 5,790,522 | A * | 8/1998 | Fichou et al. | 370/236 |
| 6,519,260 | B1 * | 2/2003 | Galyas et al. | 370/395.42 |
| 6,697,858 | B1 | 2/2004 | Ezerzer et al. | |
| 6,778,490 | B1 | 8/2004 | Achilles et al. | |
| 6,889,338 | B2 | 5/2005 | Srinivasan et al. | |
| 6,981,052 | B1 * | 12/2005 | Cheriton | 709/232 |
| 7,082,133 | B1 * | 7/2006 | Lor et al. | 370/392 |
| 7,142,513 | B2 * | 11/2006 | Sun et al. | 370/232 |
| 7,283,483 | B2 * | 10/2007 | Asawa et al. | 370/252 |
| 7,385,997 | B2 * | 6/2008 | Gorti et al. | 370/415 |
| 7,418,633 | B1 * | 8/2008 | Salpekar et al. | 714/43 |
| 2002/0194342 | A1 * | 12/2002 | Lu et al. | 709/227 |
| 2003/0223428 | A1 * | 12/2003 | Gonzalez et al. | 370/395.4 |
| 2003/0223445 | A1 * | 12/2003 | Lodha | 370/412 |
| 2005/0169172 | A1 * | 8/2005 | Wang et al. | 370/229 |

* cited by examiner

*Primary Examiner*—Scott T Baderman
*Assistant Examiner*—Joseph Schell
(74) *Attorney, Agent, or Firm*—DeMont & Breyer, LLC (57) ABSTRACT

A method for fault tolerance and fault recovery in multiprocessor systems that concurrently manage queues is disclosed. The illustrative embodiment comprises a plurality of servers, a queue of jobs to be assigned to the servers, and two queue managers—a primary unit and a secondary unit—such that the secondary fills in for the primary unit while the primary unit is down. The illustrative embodiment provides for smooth transitions from the normal state into the failure state and back into the normal state without losing jobs or violating the queue discipline of the system.

5 Claims, 12 Drawing Sheets

FAULT RECOVERY IN CONCURRENT QUEUE MANAGEMENT SYSTEMS

FIELD OF THE INVENTION

The present invention relates to data processing systems in general, and, more particularly, to fault tolerance and fault recovery in multiprocessor systems that concurrently manage queues.

BACKGROUND OF THE INVENTION

Figure 1:
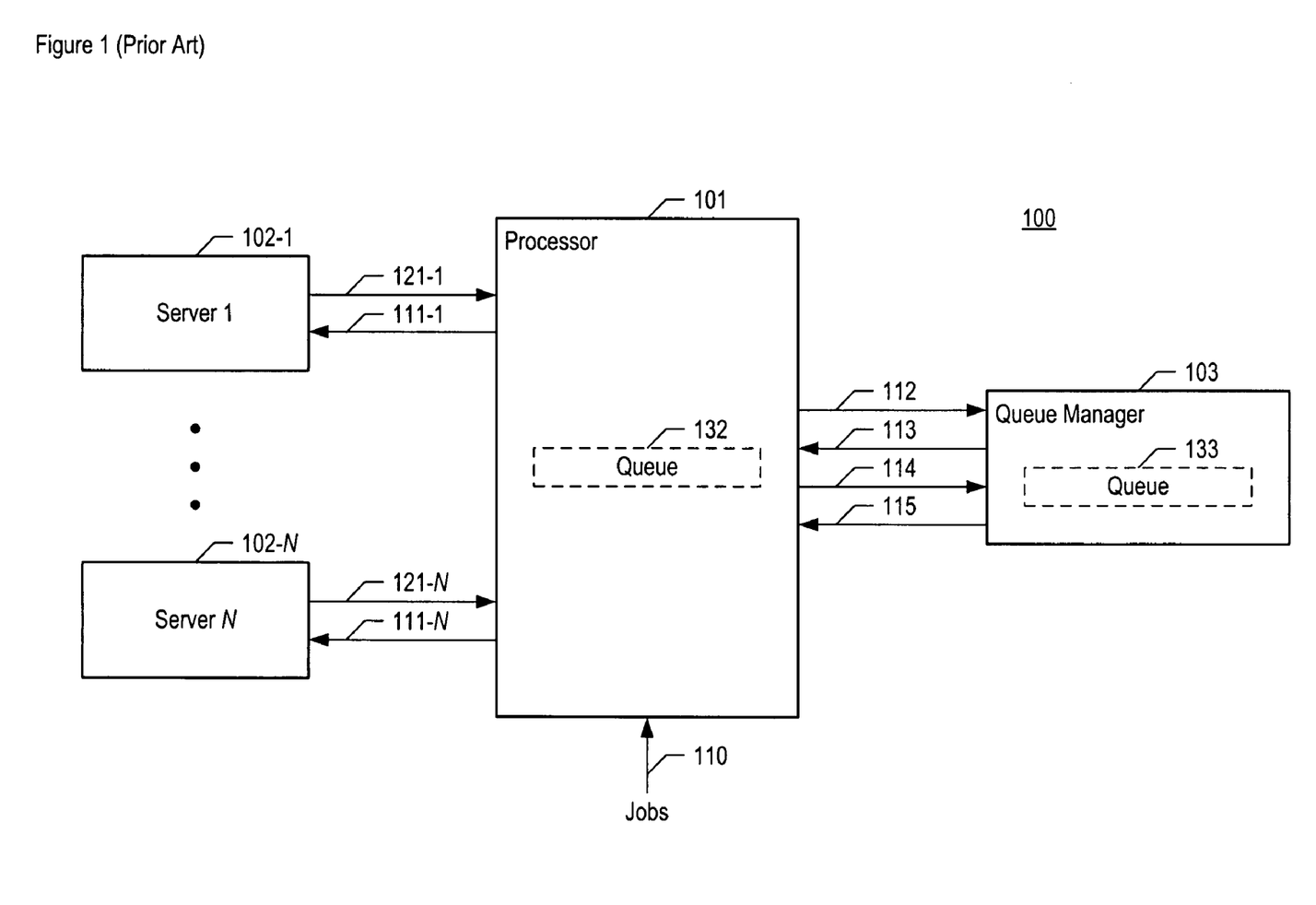
FIG. 1 depicts a block diagram of the salient components of a first job handling architectures as is well-known in the prior art.

FIG. 1 depicts a block diagram of one architecture of a job handling system in the prior art. Job handling systems have many applications such as, for example, multiprocessing computing systems, automatic call distribution in telemarketing centers, and routing of Internet Protocol (IP) packets. The fault tolerance and fault recovery capabilities of this architecture are of particular interest to an understanding of the present invention. The architecture and its fault tolerance and fault recovery capabilities will now be described.

Job handling system 100 comprises processor 101, servers 102-1 through server 102-N, wherein N is a positive integer, and queue manager 103, which are connected via the logical links shown.

Processor 101 comprises the hardware and software needed to receive jobs on logical link 110, to queue them for assignment to servers 102-1 through 102-N, when necessary, and to act as the interface between queue manager 103 and servers 102-1 through 102-N. The processes performed by processor 101 are described below in detail and with respect to FIGS. 2 and 3.

Each of servers 102-1 through 102-N is an entity that is capable of processing a job that is assigned to it. As is well known to those skilled in the art, each of servers 102-1 through 102-N is a machine, a person, or a combination of a machine and a person. Each of servers 102-1 through 102-N receives jobs from processor 101 on logical links 111-1 through 111-N, respectively. Furthermore, each of servers 102-1 through 102-N continually notifies processor 101 by transmitting a one bit idle/busy indicator on logical links 121-1 through 121-N, respectively. The idle/busy indicator expresses when the server is busy performing a job, in contrast to when it is not busy and is available to process another job.

Queue manager 103 comprises the hardware and software needed to queue information about the jobs queued in processor 101, to monitor the idle/busy indicator for each server on logical link 114, and to assign jobs to servers when they are not busy. Queue manager 103 also transmits a one-bit status indicator to processor 101 on logical link 115 that indicates whether or not queue manager 103 is operating normally.

Figure 2:
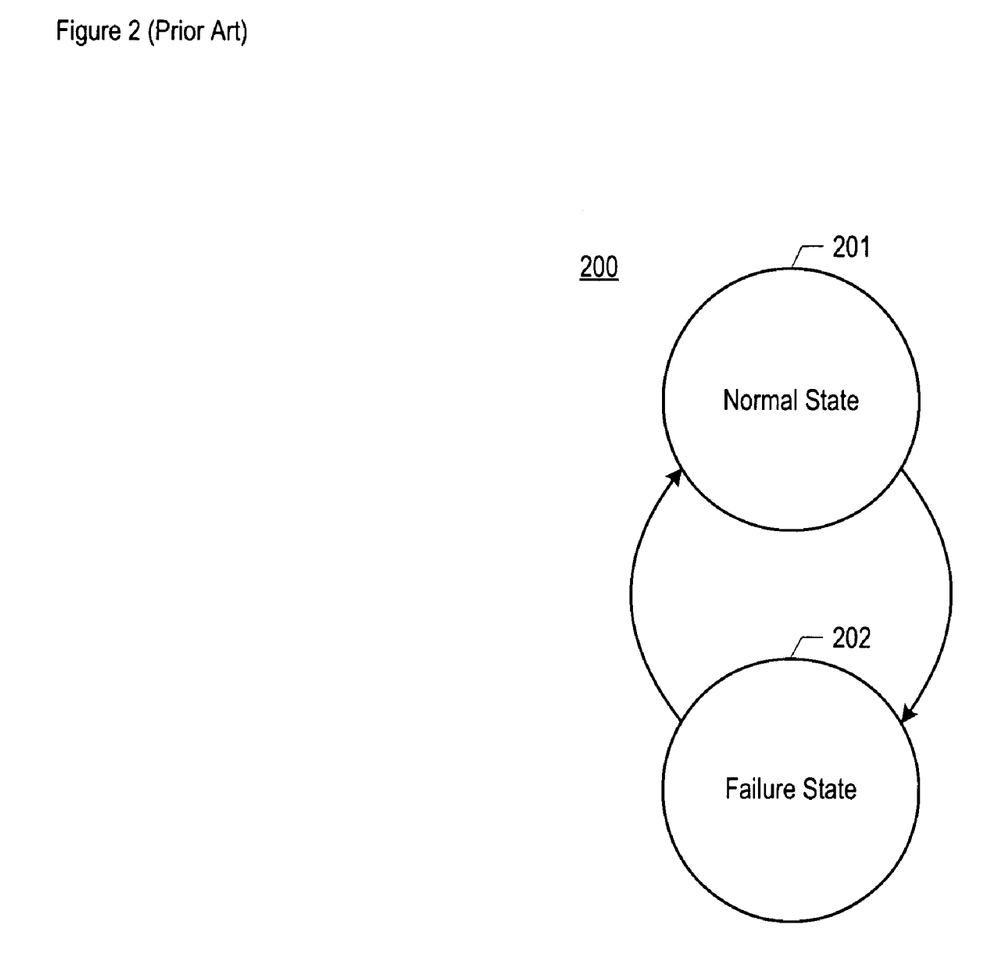
FIG. 2 depicts a state diagram of the salient fault tolerant states of job handling system 100, as shown in FIG. 1.

When queue manager 103 is operating normally, job handling system 100 is in normal state 201, as represented by state diagram 200 in FIG. 2. In contrast, when queue manager 103 crashes, job handling system 100 transitions into failure state 202. The operation of job handling system 100 in the normal state is different than when it is in the failure state.

Figure 3:
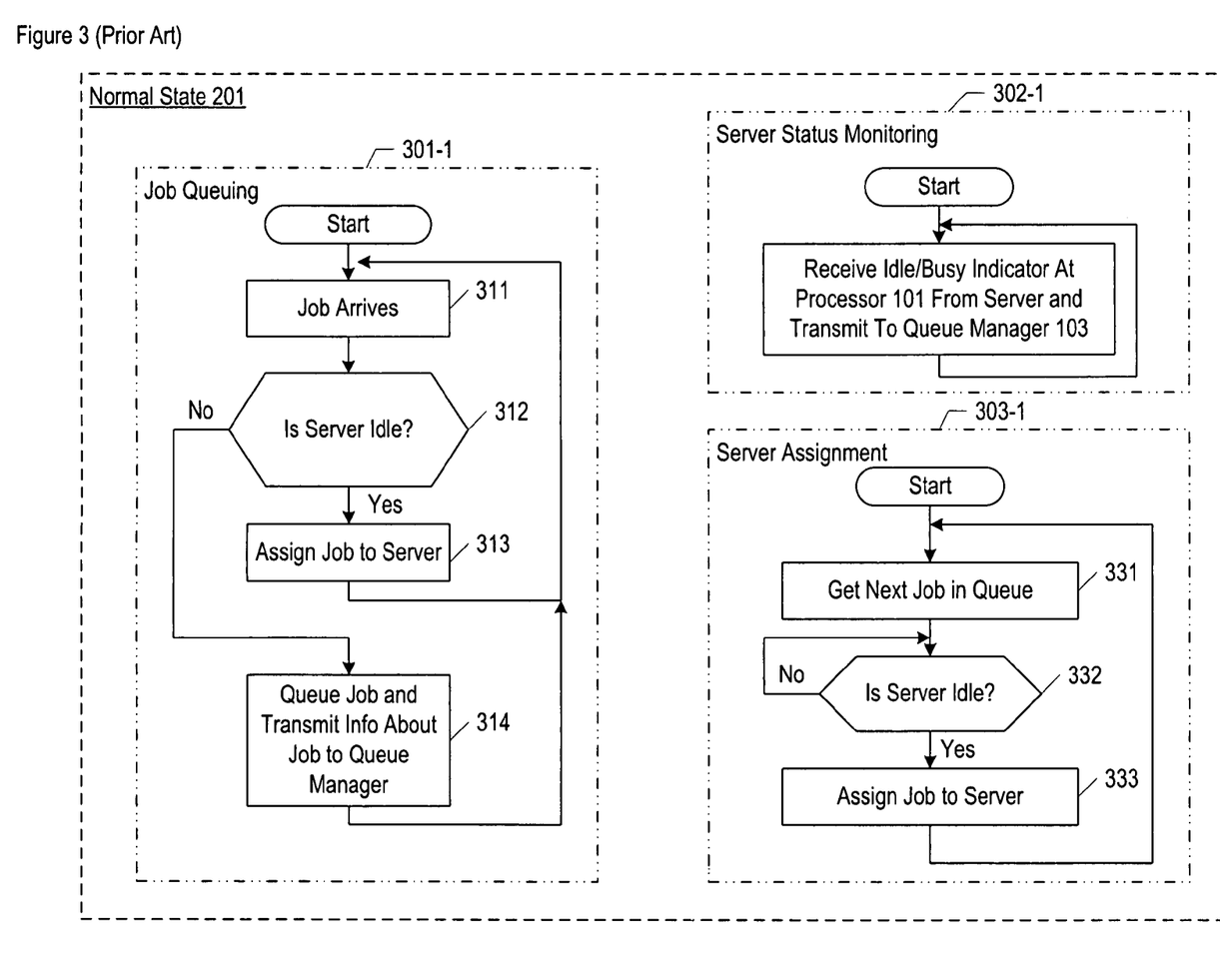
FIG. 3 depicts the tasks involved in each of the three processes involved in normal state 201 of job handling system 100.

When job handling system 100 is in normal state 201, it performs three salient asynchronous processes (as shown in FIG. 3):

i. Job Queuing Process 301-1—the reception, assignment, and possible queuing, of new jobs by processor 101,
   ii. Server Status Monitoring Process 302-1—the reception of the idle/busy indicators from servers 102-1 through 102-N at processor 101 and transmission of the indicators from processor 101 to queue manager 103, and
   iii. Server Assignment Process 303-1—the assignment of queued jobs to servers by queue manager 103.

Each of these will be discussed in turn.

Queuing Process 301-1 is executed by processor 101 upon entering normal state 201.

At task 311, a job arrives. The job can be anything that can be performed by any of servers 102-1 through 102-N. Each job can be, for example, connection-oriented (e.g., a telephone call, an instant messaging [IM] session request, etc.) or not (e.g., an e-mail, a Hyper Text Transfer Protocol [HTTP] service request, an arbitrary IP packet to be routed, etc.).

At task 312, processor 101 determines whether a server is idle, as indicated by the servers' idle/busy indicators. If so, then control passes to task 313; otherwise, control passes to task 314.

At task 313, processor 101 assigns the job to the idle server, at which time the server changes its idle/busy indicator to "busy" until it finishes the job.

At task 314, processor 101 queues the job in queue 132, and transmits a description of the job to queue manager 103 on logical link 112, which, in response, queues the description of the job in queue 133. Queue manager 103 uses the descriptions in queue 133 to infer what jobs are queued in queue 122 and to assign jobs in accordance with the queue discipline.

Server Status Monitoring Process 302-1 is executed by servers 102-1 through 102-N, processor 101, and queue manager 103 upon entering normal state 201. As shown in FIG. 3, in this process, idle/busy indicators are transmitted from one or more of servers 102-1 through 102-N, received by processor 101, and transmitted from processor 101 to queue manager 103. As will be appreciated by those skilled in the art, although server status monitoring process 302-1 is depicted in FIG. 3 as "busy waiting", it will be clear to those skilled in the art how to implement process 302-1 more efficiently.

Server Assignment Process 303-1 is executed by queue manager 103 upon entering normal state 201.

At task 331, queue manager 103 selects the next job in queue 133 to be assigned using the information about the jobs in queue 133 and the queue discipline.

At task 332, queue manager 103 determines whether a server is idle, as indicated by the servers' idle/busy indicators. If so, then control passes to task 333; otherwise, control remains in task 332.

At task 333, queue manager 103 instructs processor 101 to assign the job to the idle server via logical link 113, at which time the server changes its idle/busy indicator to "busy" until it finishes the job. As part of task 332, queue manager 103 removes the description of the job from queue 133, and processor 101 removes the job from queue 132.

By performing the three processes in normal state 201, job handling system 100 receives jobs, queues them when necessary, and assigns them to servers in well-known fashion.

Figure 4:
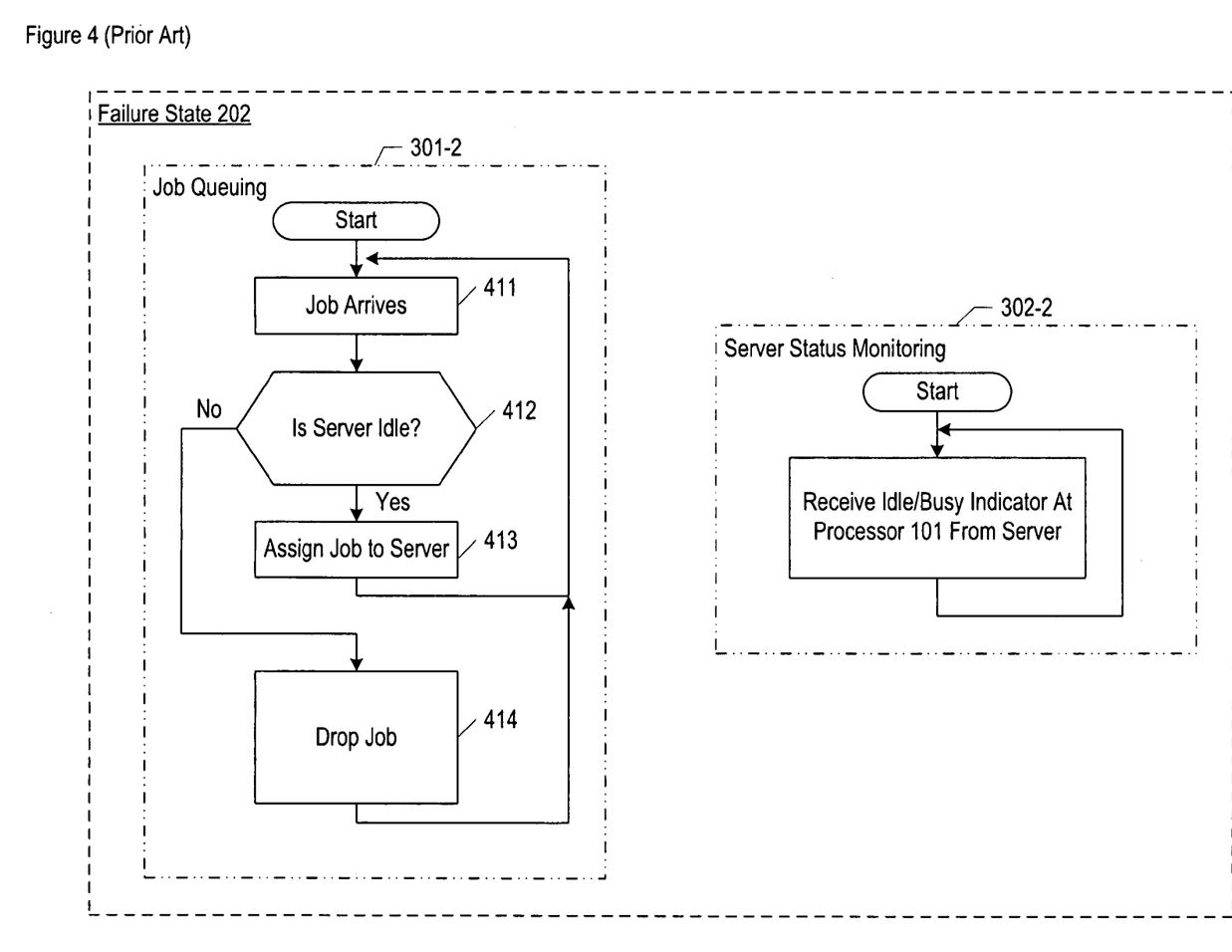
FIG. 4 depicts the tasks involved in each of the two processes involved in failure state 201 of job handling system 100.

When job handling system 100 is in failure state 202, it performs two salient asynchronous processes (as shown in FIG. 4):

i. Job Queuing Process 301-2—the reception and assignment of new jobs by processor 101, and
   ii. Server Status Monitoring Process 302-2—the transmission and reception of the idle/busy indicator from servers 102-1 through 102-N to processor 101.

Each of these will be discussed in turn.

Job Queuing Process 301-2 is executed by processor 101 upon entering failure state 202.

At task 411, a job arrives. Task 411 is identical to task 311.

At task 412, processor 101 determines whether a server is idle, as indicated by the servers' idle/busy indicators. If so, then control passes to task 413; otherwise, control passes to task 414. Task 412 is identical to task 312.

At task 413, processor 101 assigns the job to the idle server, at which time the server changes its idle/busy indicator to "busy" until it finishes the job. Task 413 is identical to task 313.

At task 414, processor 101 drops the job because it has no capability for assigning queued jobs. This is in contrast to task 314 in which those jobs that cannot be immediately assigned are queued for later assignment.

Server Status Monitoring Process 302-2 is executed by servers 102-1 through 102-N and processor 101 upon entering failure state 202. As shown in FIG. 4, in this process, idle/busy indicators are transmitted from one or more of servers 102-1 through 102-N and are received by processor 101. As will be appreciated by those skilled in the art, although server status monitoring process 302-2 is depicted in FIG. 4 as "busy waiting", it will be clear to those skilled in the art how to implement process 302-2 more efficiently.

The salient disadvantage of the first architecture is that jobs that cannot be immediately assigned are dropped, and a dropped job might be valuable and difficult or costly to replace.

Figure 5:
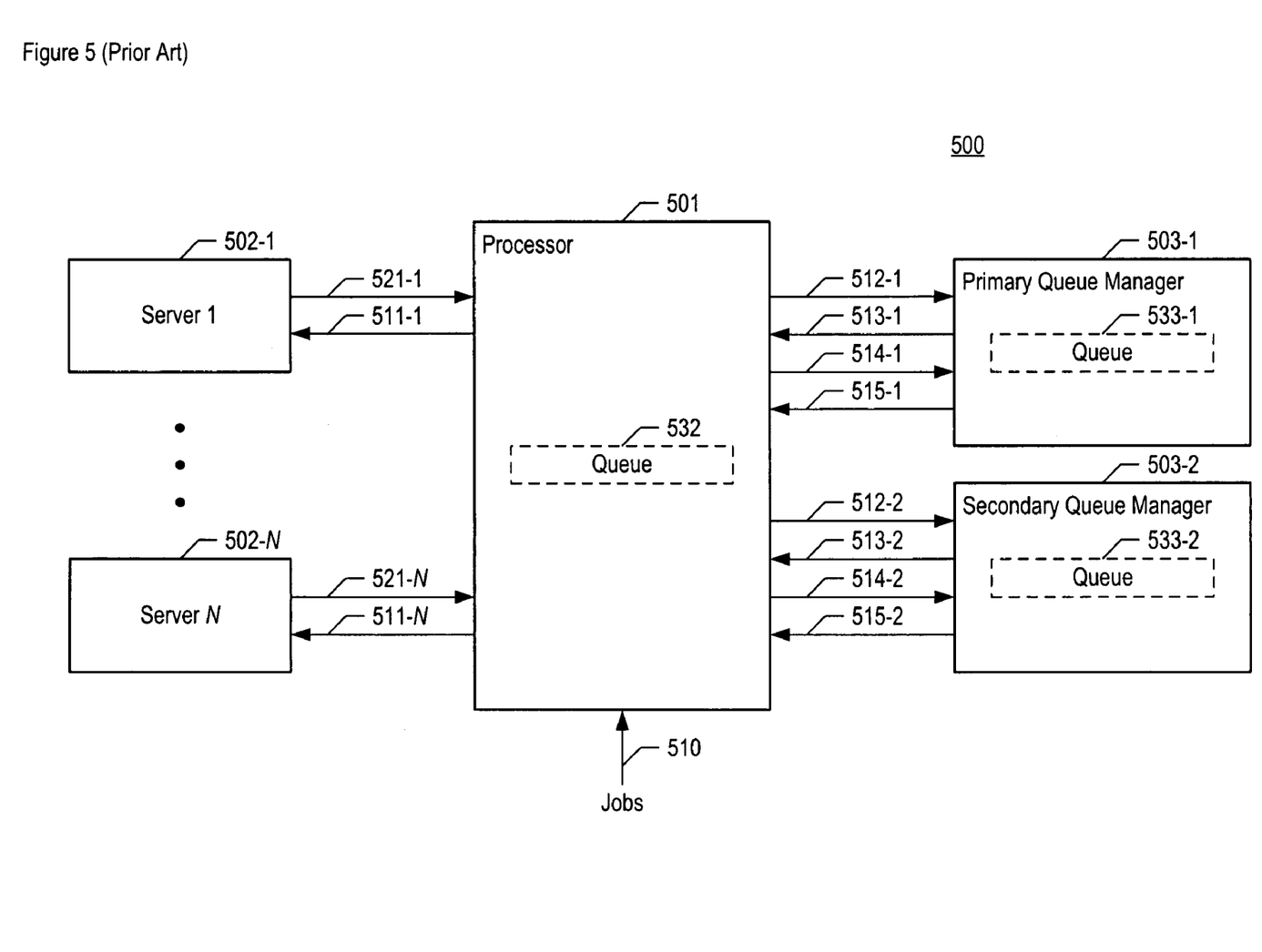
FIG. 5 depicts a block diagram of the salient components of a second job handling architectures as is well-known in the prior art.

FIG. 5 depicts a block diagram of a second architecture of a job handling system in the prior art, which has superior failure state capabilities to the architecture depicted in FIG. 1. The salient characteristic of the second architecture is that it comprises two queue managers—a primary unit and a secondary unit—such that the secondary backs up and fills in for the primary unit while the primary unit is down (i.e., when the system enters failure state 202).

Job handling system 500 comprises processor 501, servers 502-1 through server 502-N, primary queue manager 503-1, and secondary queue manager 503-2, which are connected via the logical links shown.

Processor 501 is similar to processor 101 in job handling system 100, except that it interfaces with two queue managers rather than one, as described below in detail and with respect to FIGS. 2, 6a, 6b, and 7.

Each of servers 502-1 through 502-N are identical to servers 102-1 through 102-N in job handling system 100.

Primary queue manager 503-1 and secondary queue manager are identical to each other and to queue manager 103 in job handling system 100.

When primary queue manager 503-1 is operating normally, as indicated to processor 501 by the status indicator on logical lead 515-1, job handling system 500 is in normal state 201. In contrast, when primary queue manager 503-1 crashes, as indicated to processor 501 by the status indicator on logical lead 515-1, job handling system 500 is in failure state 202.

As is described in detail below and with respect to FIGS. 2, 6a, 6b, and 7, the operation of secondary queue manager 503-2 is identical in both the normal state and the failure state, and it is the sole responsibility of processor 501 to invoke secondary queue manager 503-2 (i.e., make secondary queue manager 503-2 active).

Figure 6A:
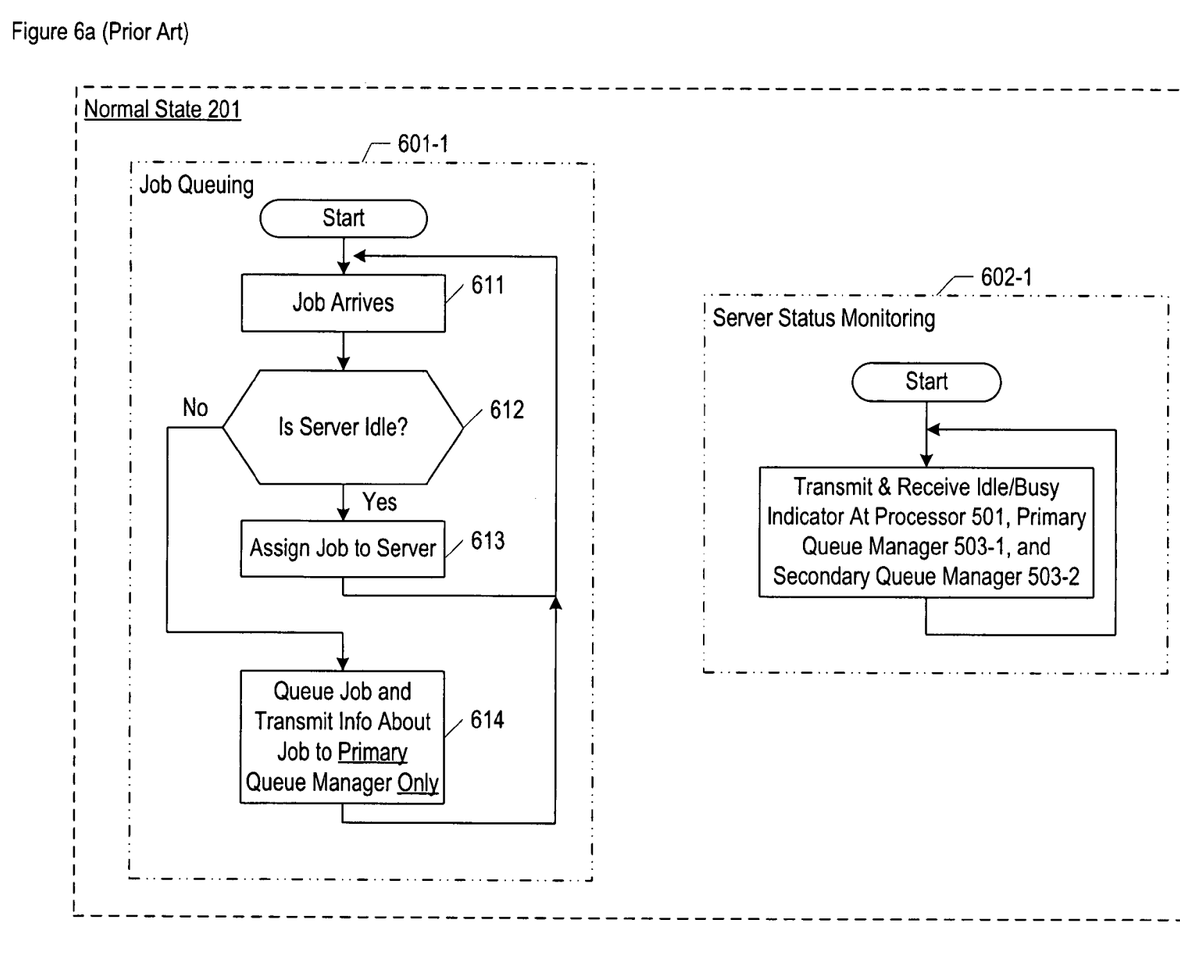
FIGS. 6a and 6b depict the tasks involved in each of the four processes involved in normal state 201 of job handling system 500, as shown in FIG. 5.
Figure 6B:
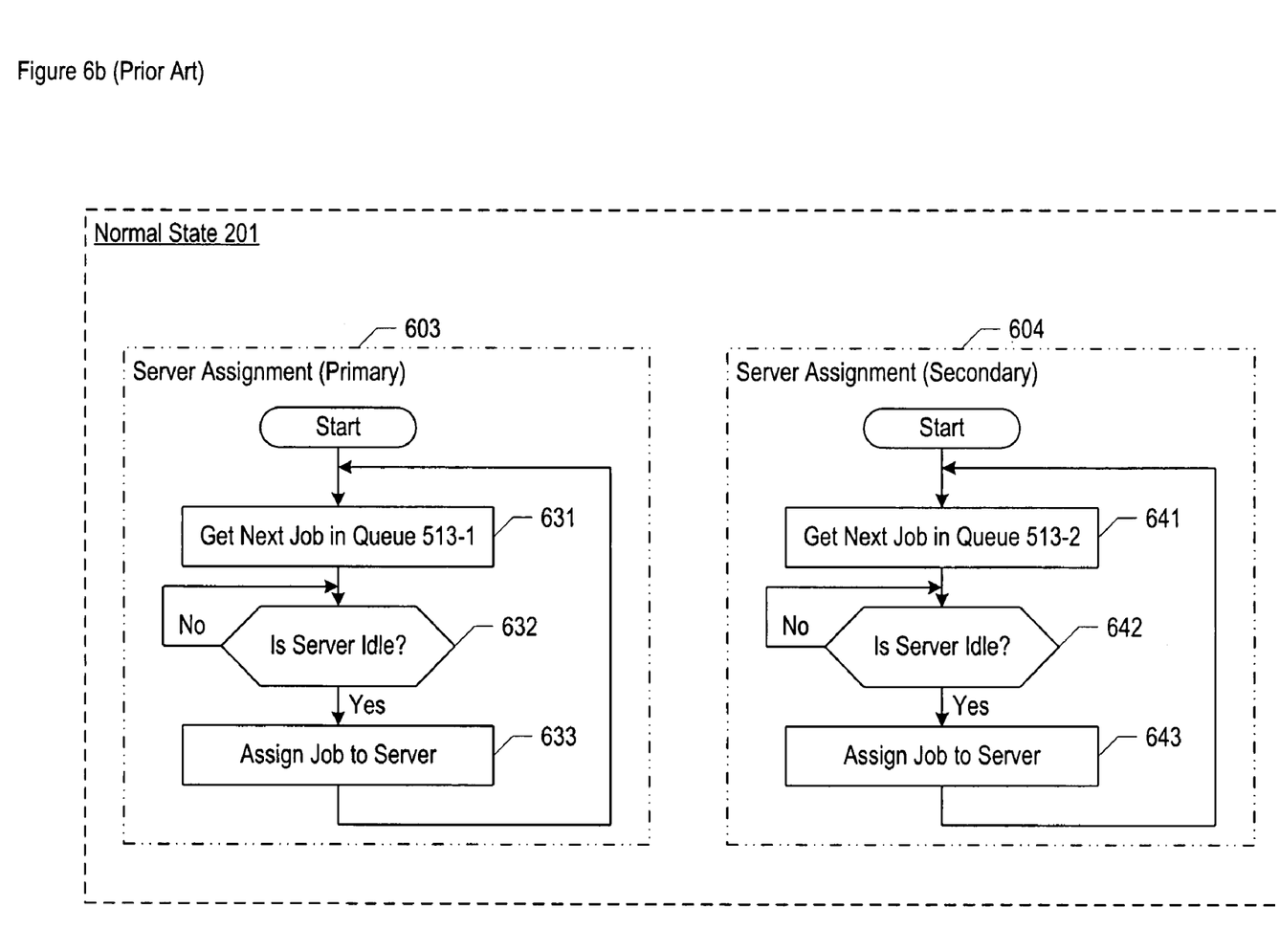

When job handling system 500 is in normal state 201, it performs four salient asynchronous processes (as shown in FIGS. 6a and 6b):

i. Job Queuing Process 601-1—the reception, and possible queuing, of new jobs by processor 501, ii. Server Status Monitoring Process 602-1—the transmission and reception of the idle/busy indicator from servers 502-1 through 502-N through processor 501 to primary queue manager 503-1 and secondary queue manager 503-2, iii. Server (Primary) Assignment Process 603—the assignment of queued jobs to servers by primary queue manager 503-1, and iv. Server (Secondary) Assignment Process 604—the assignment of queued jobs to servers by secondary queue manager 503-2.

Each of these will be discussed in turn.

Job Queuing Process 601-1 is executed by processor 501 upon entering normal state 201, and Job Queuing Process 601-1 is identical to Job Queuing Process 301-1, except that processor 501 transmits a description of the job to primary queue manager 503-1 only.

Server Status Monitoring Process 602-1 is executed by servers 502-1 through 502-N, processor 501, primary queue manager 503-1 and secondary queue manager 503-2 upon entering normal state 201.

Server (Primary) Assignment Process 603 is executed by primary queue manager 503-1 upon entering normal state 201. Server (Primary) Assignment Process 603 is identical to Server Assignment Process 303.

Server (Secondary) Assignment Process 604 is executed by secondary queue manager 503-2 upon entering normal state 201. Server (Secondary) Assignment Process 604 is identical to Server Assignment Process 303. It should be noted that secondary queue manager 503-2 does not actually assign any jobs in normal state 201 because processor 101 does not give secondary queue manager 503-2 any jobs to queue.

By performing the four processes in normal state 201, job handling system 500 receives jobs, queues them when necessary, and assigns them to servers in well-known fashion.

Figure 7:
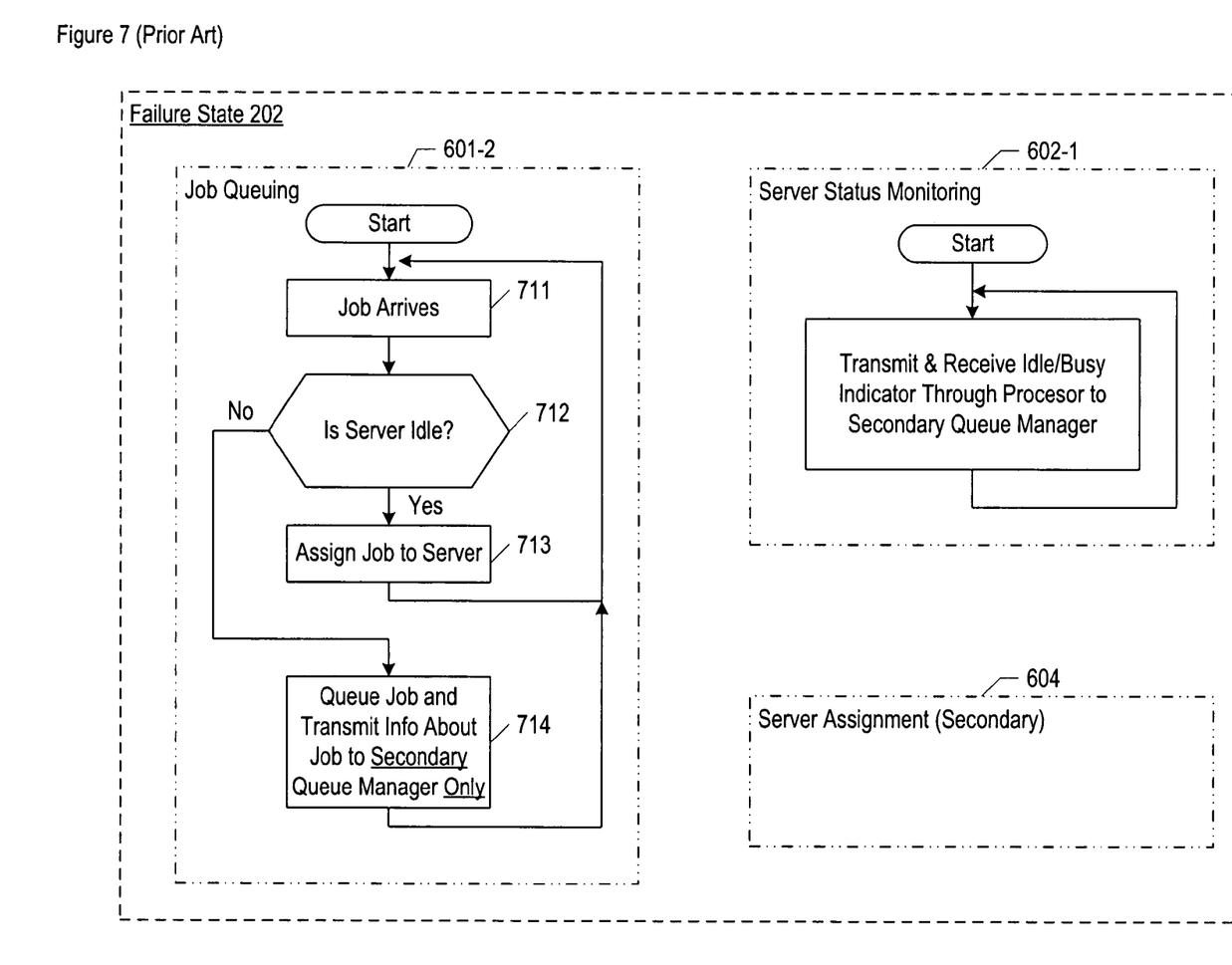
FIG. 7 depicts the tasks involved in each of the three processes involved in failure state 202 of job handling system 500.

When primary queue manager 503-1 crashes, job handling system 500 enters failure state 202 and performs three salient asynchronous processes (as shown in FIG. 7):

i. Job Queuing Process 601-2—the reception, and possible queuing, of new jobs by processor 501, ii. Server Status Monitoring Process 602-2, and iv. Server (Secondary) Assignment Process 604.

Each of these will be discussed in turn.

Job Queuing Process 601-2 is executed by processor 501 upon entering failure state 202, and Job Queuing Process 601-1 is identical to Job Queuing Process 601-2, except that processor 501 transmits a description of the job to secondary queue manager 503-2 only.

Server Status Monitoring Process 602-2 is executed by servers 502-1 through 502-N, processor 501, and secondary queue manager 503-2 upon entering failure state 202.

Server (Secondary) Assignment Process 604 is executed by secondary queue manager 503-2 upon booting up and does not change when job handling system 500 enters failure state 202.

By performing the three processes in failure state 202, job handling system 500 receives jobs, queues them when necessary, and assigns them to servers in well-known fashion.

The advantage of job handling system 500 over job handling system 100 is that job handling system 500 is fault tolerant in that it continues to function smoothly in the event of the failure of its primary queue manager.

When it is time to transition job handling system 500 back into normal state 202, the accepted industry practice is to wait until there aren't many jobs in queue 532—such as late at night—and then re-boot job handling system 500. This has the disadvantage that any jobs in queue 532 at the time are dropped. Sometimes those jobs are valuable and difficult or costly to replace. In such cases, the need exists for a method for smoothly transitioning job handling system 500 back into normal state 202 without losing jobs queued in queue 532.

SUMMARY OF THE INVENTION

The present invention provides a method for smoothly transitioning job handling system 500 from normal state 201 into failure state 202 and back again into normal state 201 without some of the costs and disadvantages for doing so in the prior art. In particular, the illustrative embodiment provides for the transition from the normal state into the failure state and back again without losing jobs or violating the queue discipline of job handling system 500.

One approach would enable primary queuing manager 503-1 to immediately begin assigning jobs in its queue upon re-entering normal state 201. But because primary queuing manager 503-1 and secondary queuing manager 503-2 operate autonomously and asynchronously and have no mechanism for coordinating their actions, the two would be contending for servers when they both have jobs to assign. Furthermore, if primary queuing manager 503-1 were to win any contention, its jobs would be serviced before the jobs in secondary queuing manager 503-2, which might violate the queue discipline of job handling system 500.

A second approach would require primary queuing manager 503-1 to wait upon re-entering normal state 201 until it could reasonably infer that secondary queuing manager 503-2 had no more jobs to assign (i.e., queue 433-2 is empty). For example, primary queuing manager 503-1 might infer that secondary queuing manager 503-2 has no more jobs to assign when all of the servers' idle/busy status indicators have been idle for a given time interval. This approach eliminates the potential contention and queue discipline problems of the first approach; however, it suffers from the disadvantage of waiting longer than necessary to assign jobs in primary queuing manager 503-1's queue (i.e., queue 433-1) to idle servers.

A third approach—and that adopted by the illustrative embodiment—enables primary queuing manager 503-1 to recover the responsibility of assigning jobs from secondary queuing manager 503-2 on a server-by-server basis. In other words, primary queuing manager 503-1 recovers the right to assign jobs to servers on a server-by-server basis after it infers that secondary queuing manager 503-2 will not again assign a job to that server. Primary queuing manager 503-1 infers that secondary queuing manager 503-2 will not again assign a job to a given server by observing that the server has been idle for at least a time interval T, wherein Server (Secondary) Assignment Process 604 is designed to ensure that jobs are assigned to servers so that they are idle less than the time interval T. Once primary queuing manager 503-1 has inferred that a given server is available to it, primary queuing manager 503-1 thereafter no longer waits until that server is idle for the time interval T again before assigning a job to it, but assigns the job to it immediately.

The illustrative embodiment is advantageous in that (1) it eliminates the contention issue between the primary queuing manager 503-1 and the secondary queuing manager 503-2, (2) it maintains the queue discipline of the system, and (3) prevents the jobs in primary queuing manager 503-1 from unnecessarily waiting to be serviced.

The illustrative embodiment comprises: queuing at a primary queue manager a first job to be served by a first server; queuing at a secondary queue manager a second job to be served by the first server; transmitting a first idle/busy indicator for the first server to the primary queue manager and the secondary queue manager; assigning the second job to the first server within a first time interval after the first idle/busy indicator becomes idle; and assigning the first job to the first server only after the first idle/busy indicator has been idle for at least the first time interval.

DETAILED DESCRIPTION

Figure 8:
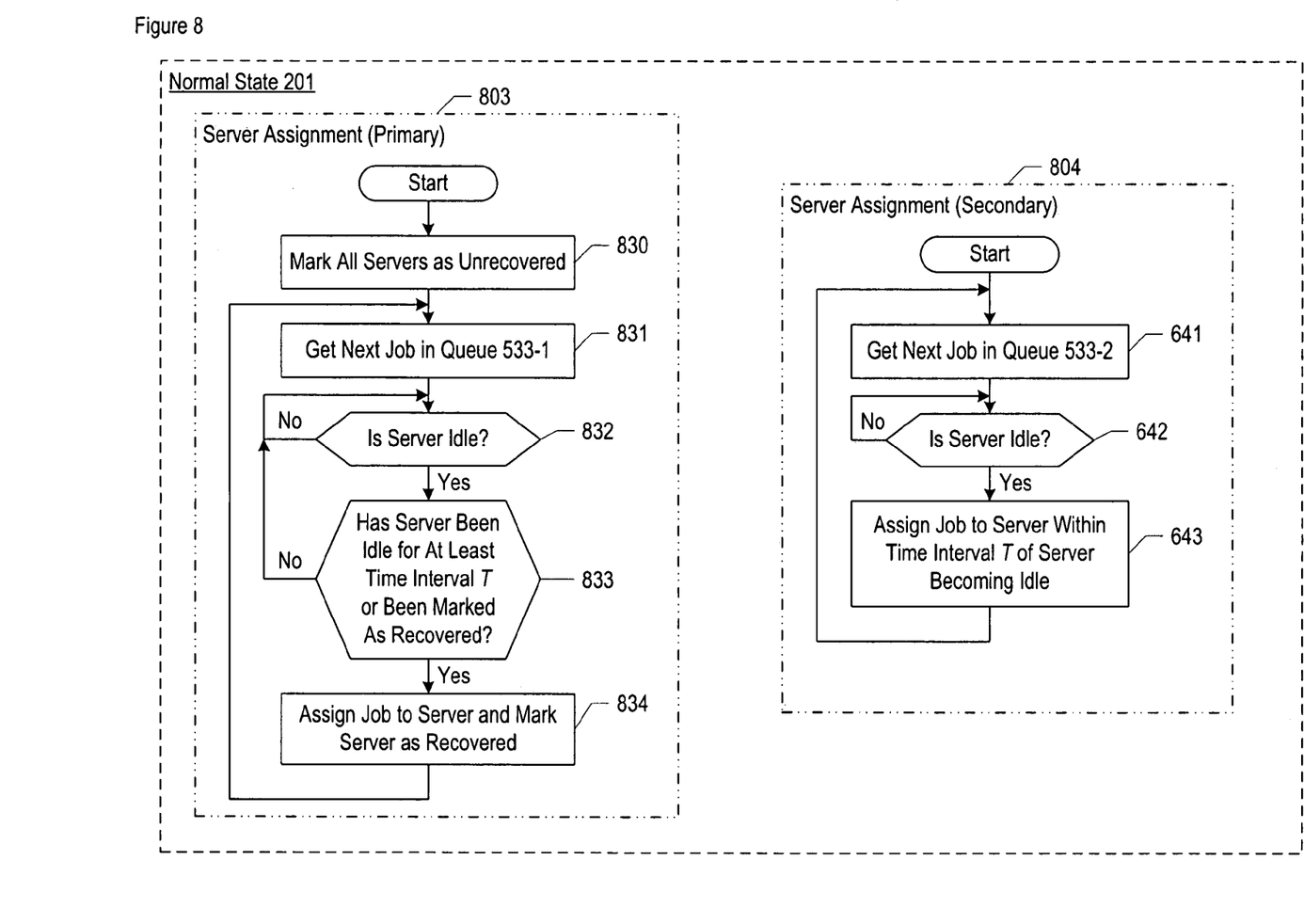
FIG. 8 depicts the tasks involved in the improved Server (Primary) Assignment Process 803 and the improved Server (Secondary) Assignment Process 804, in accordance with the illustrative embodiment of the present invention.

The illustrative embodiment of the present invention requires that Server (Primary) Assignment Process 603 and the improved Server (Secondary) Assignment Process 664 be modified as described in detail below and as depicted in FIG. 8. By using the improved Server (Primary) Assignment Process 803 and the improved Server (Secondary) Assignment Process 804, rather than the processes of the prior art, job handling system 500 transitions smoothly from normal state 201 into failure state 202 and back again into normal state 201 without losing jobs.

Server (Primary) Assignment Process 803 is executed by primary queue manager 503-1 upon entering normal state 201.

At task 830, a flag for each server is set to "unrecovered." The motivation for this is that at the beginning of Process 803, secondary queue manger 503-2 is assigning jobs to all of the servers without the possibility of contention with primary queue manager 503-1, and primary queue manager 503-1 has not yet regained the right to assign jobs to any server without the possibility of contention.

At task 831, primary queue manager 503-1 gets the next job in queue 533-1 to be assigned to a server using the information about the jobs in queue 533-1 and the queue discipline. Task 831 is identical to task 631 in the prior art.

At task 832, primary queue manager 503-1 determines whether a server is idle, as indicated by the servers' idle/busy indicators. If so, then control passes to task 833; otherwise, control remains in task 832. Task 832 is identical to task 632 in the prior art.

At task 833, primary queue manager 503-1 determines whether that server has either (i) been idle for at least time interval T, or (ii) has its flag set to "recovered." If so, then control passes to task 834; otherwise, control passes to task 832.

At task 834, primary queue manager 503-1 can reasonably infer that secondary queue manager 503-2 is not going to assign a job to that server again (i.e., that it is not going to contend with secondary queue manager 503-2 to assign jobs to that server), and, therefore, that primary queue manager 503-1 can henceforth assign jobs to that server without the possibility of contention. To this end, primary queue manager 503-1 assigns the job to the server and sets the flag for that server as "recovered." From task 834, control passes back to 831.

Server (Secondary) Assignment Process 804 begins at task 841 by getting the next job in queue 533-2 to be assigned to a server using the information about the jobs in queue 533-2 and the queue discipline. Task 841 is identical to task 641 in the prior art.

At task 842, secondary queue manager 503-2 determines whether a server is idle, as indicated by the servers' idle/busy indicators. If so, then control passes to task 843; otherwise, control remains in task 842. Task 842 is identical to task 642 in the prior art.

At task 843, secondary queue manager 503-2 assigns the job to the server within the time interval T of the server's idle/busy indicator becoming idle.

By performing the improved Server (Primary) Assignment Process 803 and the improved Server (Secondary) Assignment Process 804, job handling system 500 transitions smoothly from normal state 201 into failure state 202 and back again into normal state 201 without losing jobs. In particular, the illustrative embodiment enables primary queue manager 503-1 to regain the right to assign jobs to servers—without the fear of contention—on a server-by-server basis as the number of jobs in secondary queue manager 503-2's queue (i.e., queue 533-3) dwindle.

Figure 9:
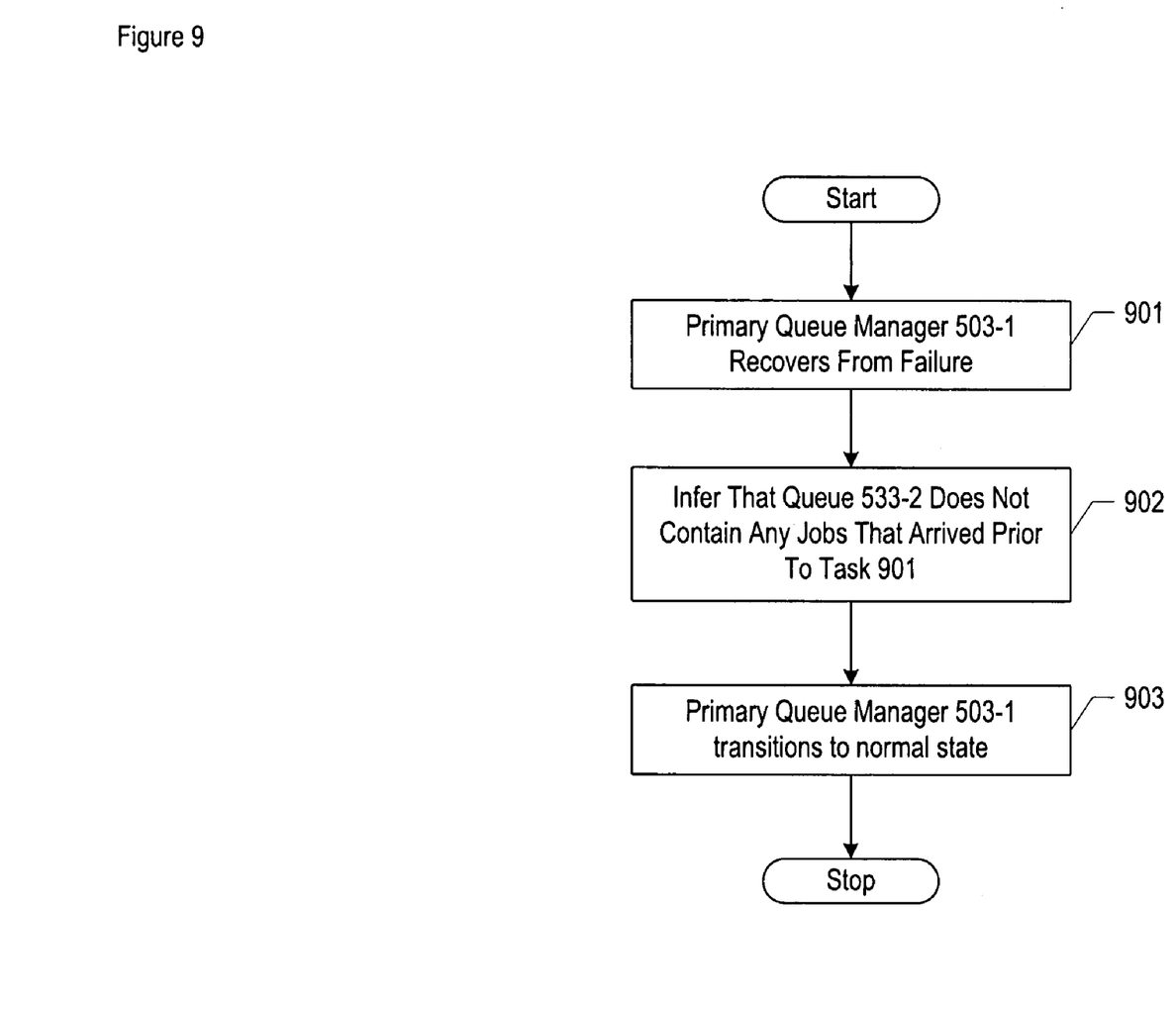
FIG. 9 depicts, at a higher level of abstraction, the salient tasks involved when primary queue manager 503-1, as shown in FIG. 5, recovers from a failure, in accordance with the illustrative embodiment of the present invention.

FIG. 9 depicts, at a higher level of abstraction, the salient tasks involved when primary queue manager 503-1 recovers from a failure, in accordance with the illustrative embodiment of the present invention.

At task 901, primary queue manager 503-1 recovers from a failure, in well-known fashion.

At task 902, job handling system 500 infers that queue 533-2 of secondary queue manager 503-2 does not contain any jobs that arrived prior to task 901 (i.e., that arrived prior to the recovery of primary queue manager 503-1). As described in detail below and with respect to FIG. 10, the inference of task 902 is performed without any knowledge of the contents of queue 533-2, and thus task 902 is performed by an entity of job handling system 500 other than secondary queue manager 503-2 (e.g., by recovered primary queue manager 503-1, etc.)

At task 903, primary queue manager 503-1 transitions to the normal state.

After task 903, the method of FIG. 9 terminates.

Figure 10:
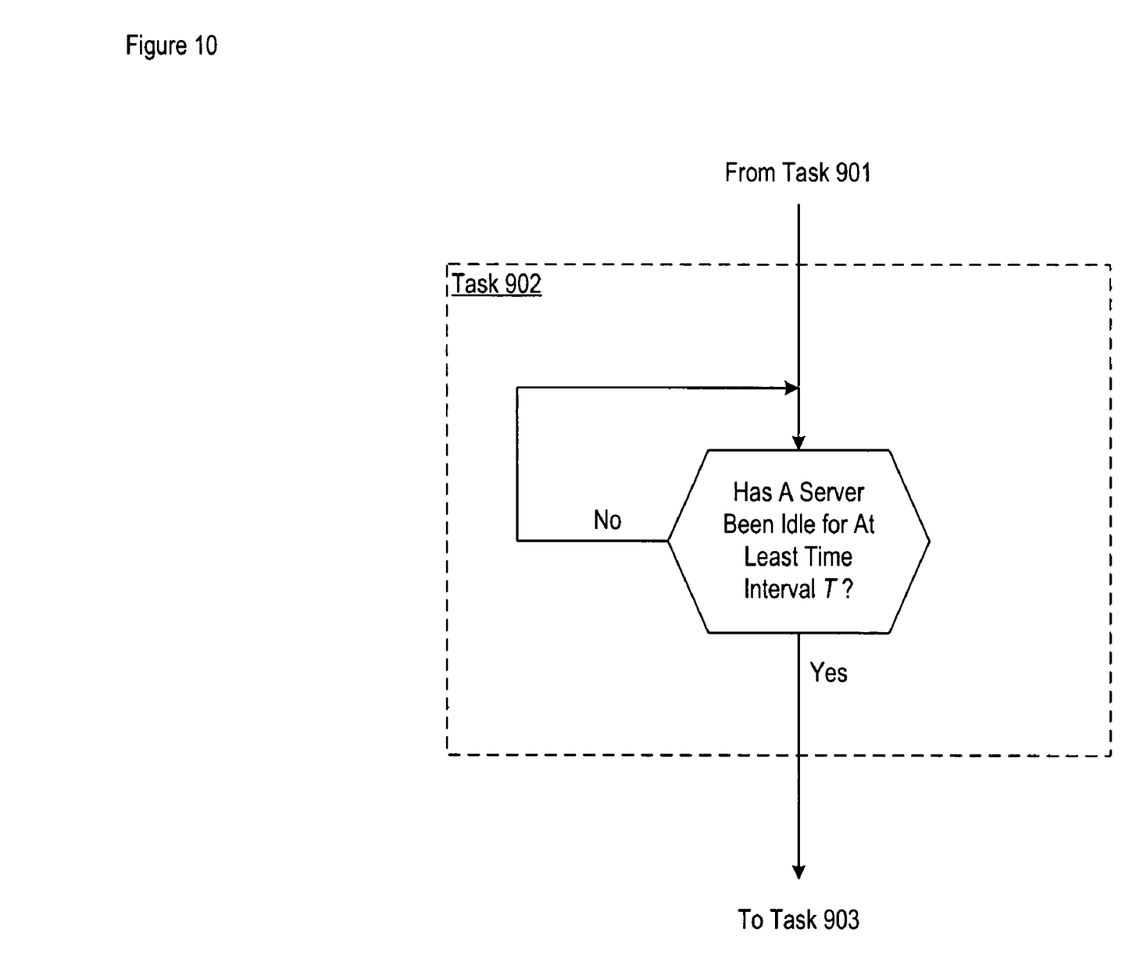
FIG. 10 depicts a detailed flowchart of task 902, as shown in FIG. 9, in accordance with the illustrative embodiment of the present invention.

FIG. 10 depicts a detailed flowchart of task 902, in accordance with the illustrative embodiment of the present invention.

As shown in FIG. 10, task 902 checks whether any server 502-$i$ has been idle for at least time interval T, as in task 833. If so, execution proceeds to task 903, otherwise execution continues back at task 902.

As will be appreciated by those skilled in the art, although task 902 is depicted as "busy waiting", it will be clear to those skilled in the art how to implement task 902 more efficiently.

Figure 11:
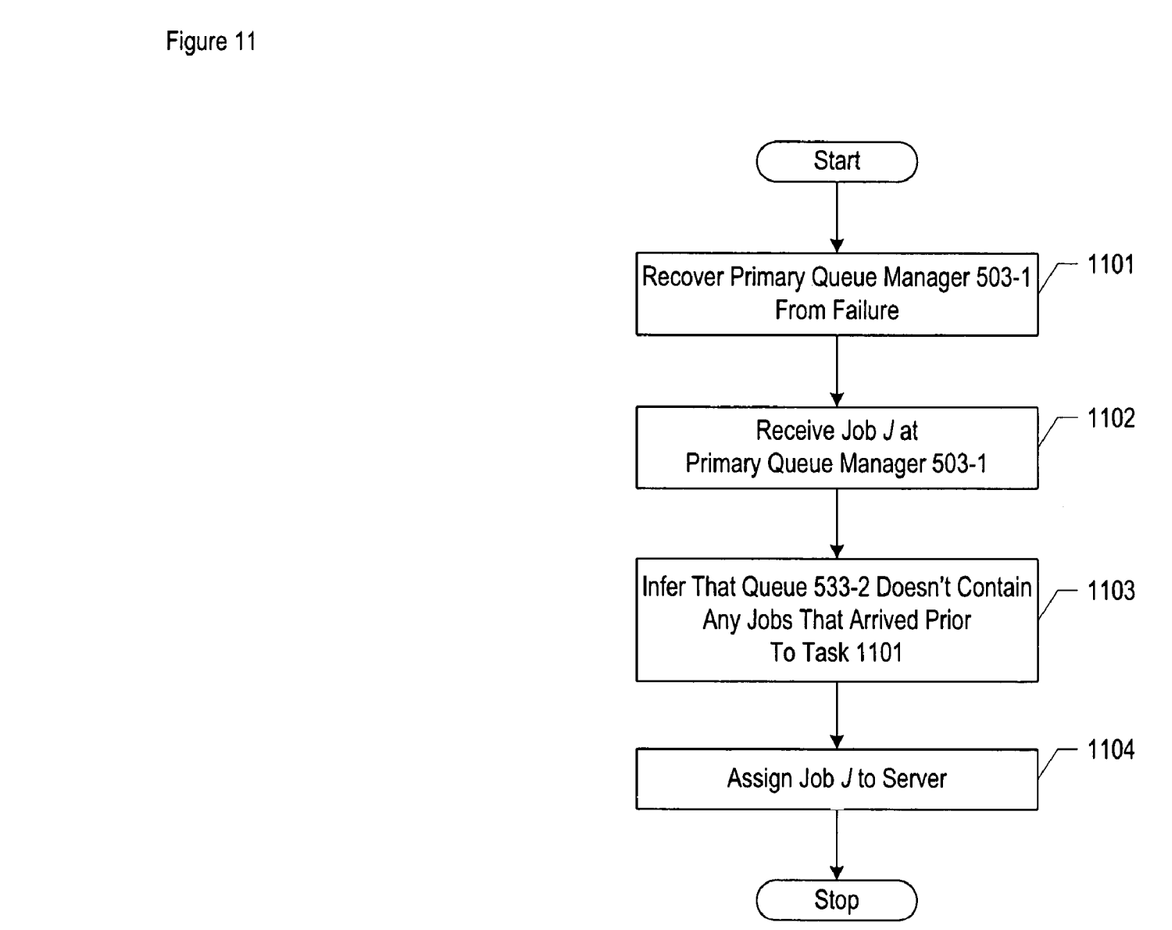
FIG. 11 depicts the failure recovery process of FIG. 9 when primary queue manager 503-1 receives a job before entering the normal state, in accordance with the illustrative embodiment of the present invention.

FIG. 11 depicts the failure recovery process of FIG. 9 when primary queue manager 503-1 receives a job before entering the normal state, in accordance with the illustrative embodiment of the present invention.

At task 1101, primary queue manager 503-1 recovers from a failure, as in task 901.

At task 1102, primary queue manager 503-1 receives a job J. Primary queue manager 503-1 refrains from assigning job J to a server until after the inference of task 1103 below.

At task 1103, job handling system 500 infers that queue 533-2 of secondary queue manager 503-2 does not contain any jobs that arrived prior to task 1101, in the same manner as tasks 902 and 1001. As in task 902, the inference is performed without any knowledge of the contents of queue 533-2.

At task 1104, primary queue manager 503-1 assigns job J to idle server 502-$i$.

After task 1104, the method of FIG. 11 terminates.

As will be appreciated by those skilled in the art, although in the illustrative embodiment primary queue manager 503-1 and secondary queue manager 503-2 are identical, in some embodiments of the present invention these queue managers might be different. For example, in some embodiments the queue managers might employ different queue disciplines, while in some other embodiments one of the queue managers might provide more functionality than the other queue manager, or one of the queue managers might be hardware-based while the other queue manager is software-based, and so forth. It will be clear to those skilled in the art, after reading this specification, how to make and use such embodiments of the present invention.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   queuing at a first queue manager a first job to be served by a first server;
   queuing at a second queue manager a second job to be served by said first server;
   transmitting a first idle/busy indicator for said first server to said first queue manager and said second queue manager;
   assigning said second job to said first server within a first time interval after said first idle/busy indicator becomes idle;
   assigning said first job to said first server only after said first idle/busy indicator has been idle for at least said first time interval;
   queuing a third job to be served by a second server at said first queue manager;
   queuing a fourth job to be served by said second server at said second queue manager;
   transmitting a second idle/busy indicator for said second server to said first queue manager and said second queue manager;

assigning said fourth job to said second server by said second queue manager within a second time interval after said second idle/busy indicator becomes idle; and assigning said third job to said second server by said first queue manager only after said second idle/busy indicator has been idle for at least said second time interval.

2. The method of claim 1 wherein said second job and said fourth job are queued in said second queue manager before said first job and said third job are queued in said first queue manager.

3. The method of claim 1 wherein said fourth job is assigned to said second server before said third job is assigned to said second server.

4. The method of claim 1 wherein said third job is assigned to said second server before said first job is assigned to said first server.

5. The method of claim 1 wherein one or more of said first job, said second job, said third job, and said fourth job are telephone calls.

* * * * *